United States Patent
Brodsky et al.

(10) Patent No.: US 7,499,173 B1
(45) Date of Patent: Mar. 3, 2009

(54) INTERFEROMETRIC METHOD AND APPARATUS FOR MEASURING OPTICAL SIGNAL QUALITY IN OPTICAL COMMUNICATIONS SYSTEM

(75) Inventors: Mikhail Brodsky, Millburn, NJ (US); Mark David Feuer, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 133 days.

(21) Appl. No.: 11/287,668

(22) Filed: Nov. 28, 2005

(51) Int. Cl.
*G01B 9/02* (2006.01)
(52) U.S. Cl. ..................... 356/450; 356/477
(58) Field of Classification Search .............. 356/479, 356/477, 450
See application file for complete search history.

(56) References Cited

U.S. PATENT DOCUMENTS 5,196,903 A * 3/1993 Masutani .................. 356/451

2002/0163684 A1* 11/2002 Lu et al. .................... 359/110

OTHER PUBLICATIONS

R.C. Coutinho et al., Detection of Coherent Light in an Incoherent Background, Nov. 11, 1999, IEEE, vol. 1, pp. 247-248.*

* cited by examiner

*Primary Examiner*—Tarifur Chowdhury
*Assistant Examiner*—Michael Lapage

(57) ABSTRACT

Differences in the interferometric patterns of modulated telecommunication signals and broadband optical noise sources are identified and are exploited in measuring the optical signal-to-noise measurements in reconfigurable photonic networks. A light output power from said interferometer corresponding to a specified delay setting in the interferometer is measured, and a coherent optical signal is distinguished from the incoherent optical noise based on the light output power measurement.

14 Claims, 4 Drawing Sheets

INTERFEROMETRIC METHOD AND APPARATUS FOR MEASURING OPTICAL SIGNAL QUALITY IN OPTICAL COMMUNICATIONS SYSTEM

FIELD OF THE INVENTION

The present invention relates generally to measuring the quality of an optical signal transmitted in a photonics network, and, more particularly, to techniques for using an interferometer to separate a modulated, coherent signal from incoherent noise mixed with the signal.

BACKGROUND OF THE INVENTION

As optical transmission distances become longer and photonic networks begin to assume some of the routing functions formerly associated with electronic switching, there is a need for optical performance monitoring, and optical signal-to-noise ratio (OSNR) measurement in particular.

Direct spectrum measurement using tunable filters cannot distinguish between coherent signal power and incoherent noise power. It must rely on baseline measurements at signal-free wavelengths, but such baseline wavelengths may not be present in advanced networks with optical add/drop functions.

Polarization-based techniques offer a way to reject a signal so that the noise can be measured, but are susceptible to errors induced by partial polarization of the noise and by depolarization of the signal.

There remains a need for a system that is well suited to signal integrity monitoring and diagnostics, and that permits measurement of OSNR.

SUMMARY OF THE INVENTION

The present invention addresses the needs described above by providing, in one embodiment of the invention, a method for measuring the signal quality of light present in an optical communication medium, the light including at least one substantially coherent optical signal degraded by substantially incoherent optical noise. The method includes the step of passing at least a portion of the light through an interferometer capable of introducing a specified delay into at least one light beam of a plurality of beams split from the portion of the light. A light output power from the interferometer corresponding to a first specified delay setting is measured, and the coherent optical signal is distinguished from the incoherent optical noise based on the light power measurement.

The step of distinguishing the coherent optical signal from the incoherent optical noise may be based on the light power measured at a given optical frequency.

The method may further include the step of computing a numerical value representing signal quality from relative magnitudes of the coherent optical signal and the incoherent optical noise. In that case, the method may also include the step of determining a numerical value of an optical signal-to-noise ratio.

The optical communication medium may be an optical fiber. The step of distinguishing the coherent optical signal from the incoherent optical noise based on the light power measurement may further comprise extracting an envelope of an interferogram. The at least one coherent optical signal may be modulated with live data traffic during the measuring step.

The method may further comprise the steps of measuring the light output power from an interferometer at a second specified delay setting, and using power measurements corresponding to the first and second specified delay settings to determine a modulation format of the substantially coherent optical signal. Further, the first specified delay and the second specified delay may be provided by adjusting a resettable beam delayer under the control of a delay controller.

In another embodiment of the invention, an apparatus is provided for monitoring an optical signal quality of a light signal transmitted in an optical transmission medium. The apparatus includes a tap connected to the optical transmission medium for tapping off a portion of the light signal, and a splitter for forming two beams from the tapped portion of the light signal. The apparatus further includes a beam delayer for introducing a first specified delay into at least one of the two beams, and instrumentation for measuring a light output power from an interferogram formed from the two beams including the first specified delay. A processor is connected for receiving a measurement of the light output power from the instrumentation. A computer readable medium contains instructions that, when executed by the processor, cause the processor to extract a numerical value from the light output power measurement representing a relative magnitude of coherent and incoherent parts of the light signal.

The computer readable instructions may contain an algorithm for distinguishing a coherent optical signal from an incoherent optical noise based on the light power output measurement. The algorithm for distinguishing the coherent optical signal from the incoherent optical noise based on the light power may be performed on data taken at a given optical frequency. The algorithm may extract an envelope of an interferogram.

The computer readable instructions may further cause the processor to determine a numerical value of an optical signal-to-noise ratio. The optical communication medium may be an optical fiber. The coherent part of the light signal may be modulated with live data traffic.

The apparatus may further comprise a second beam delayer for introducing a second specified delay, and the instrumentation may further be for measuring a light output power from an interferogram formed from the two beams including the second specified delay. In that case, the computer readable instructions further cause the processor to use power measurements corresponding to the first and second specified delays to determine a modulation format of the coherent part of the light signal.

The apparatus may further include a delay controller capable of adjusting a resettable beam delayer to obtain the first specified delay and the second specified delay.

DETAILED DESCRIPTION OF THE INVENTION

The present invention overcomes the above-described problems by determining the OSNR of signals propagating in photonic networks. By using an interferometer, the inventors distinguish between a coherent optical signal and an incoherent noise occupying the same optical band.

Interferometry of CW Light

When a continuous wave (CW) light with frequency ω and the power $I_0$ enters a Michelson interferometer, the transmitted power $I_T$ is given by the following expression:

$$I_T = \frac{I_0}{2}(1 + \cos\omega\tau) \qquad (1)$$

where τ is the delay between two arms of the interferometer expressed in units of time. A rigorous mathematical treatment is given in Hermann Haus, "Waves and Fields in Optoelectronics" at § 3.6, the content of which is incorporated by reference herein. Depending on the interferometer delay, the transmitted power oscillates between $I_0$, corresponding to full transmission of the incident power, and zero, corresponding to total reflection of the incident light back to the input port. Those oscillations continue up to very large values of the interferometer delay, determined by the coherence time of the source (at least 100 ns for laser sources).

Interferometry of a Finite Spectral Width Light Source

The equation above can be easily generalized for a light source carrying many frequency components. Assuming that each frequency component $\omega_k$ has spectral power $I_k$, then the transmitted power $I_T$ is given by:

$$I_T = \frac{1}{2}\sum_k I_k + \frac{1}{2}\sum_k I_k \cos\omega_k\tau \qquad (2)$$

The first term of that equation is half of the total spectral power, and the second term, viewed as a function of the interferometer delay τ, is simply half of the real Fourier transform of the incident spectrum. Thus the shape of the interferogram can be used to determine the complete optical power spectrum.

Figure 1:
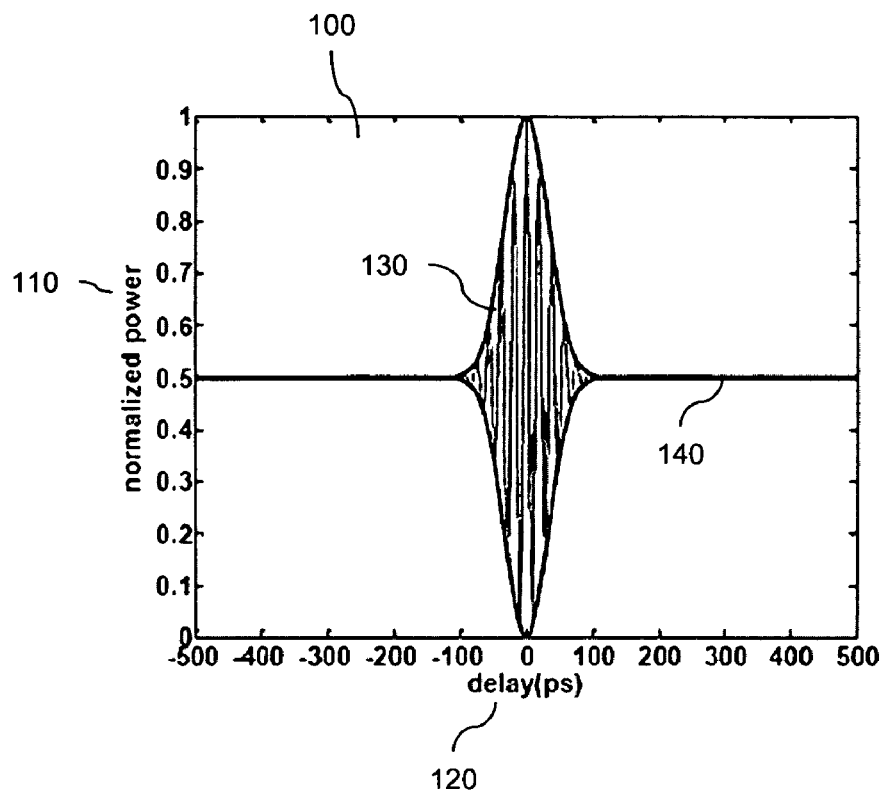
FIG. 1 is a schematic plot of oscillations of optical power as a function of interferometer delay for a Gaussian-filtered noise source.

The result of equation (2) can be easily illustrated for a special case of a source whose width δω is much smaller than its center frequency $\omega_0$. FIG. 1 is a theoretical plot 100 showing normalized power 110 as a function of interferometer delay 120. The transmitted power $I_T$ still has rapid oscillations with the interferometer delay τ at the center frequency $\omega_0$, but this oscillatory pattern is confined within a bellshape-like envelope 130 of the width about 1/δω as shown schematically in the plot of FIG. 1. While the exact shape of the envelope depends on the shape of the incident spectrum, the transmitted power $I_T$, in contrast to the monochromatic case, asymptotically approaches a constant level of $I_0/2$ (shown at 140) for sufficiently large values of the interferometer delay τ (greater then the inverse width of the incident spectrum 1/δω).

Note that the "broadband" terminology used herein may be confusing. Optical noise sources that are conventionally called "broadband" in the telecommunication community have a width of about 10 nm (1.25 THz), and are centered around 1550 nm (193.5 THz). So all these sources have, in fact, a rather narrow width when it is compared with their center frequency. Thus, the special case considered above fully describes situations that are of interest herein.

Note that numerical calculations of the Fourier transform of a narrow power spectrum centered on high frequency are cumbersome. However, it follows from the convolution theorem that the envelope alone can be obtained by the Fourier transformation of the power spectrum shifted to zero frequency.

Interferometry of a Modulated Signal

In telecom systems, digital information is encoded in the optical signal by modulating a coherent CW laser light with a sequence of 0's and 1's. That modulation causes spectral broadening of the initial laser line. Although a modulated carrier may produce a power spectrum that is quite similar to that of a filtered noise source, its interferogram will, in general, be different. The discussion below considers the most widely-deployed modulation format: simple NRZ OOK modulation. The analysis can be easily extended to other modulation formats.

Figure 2:
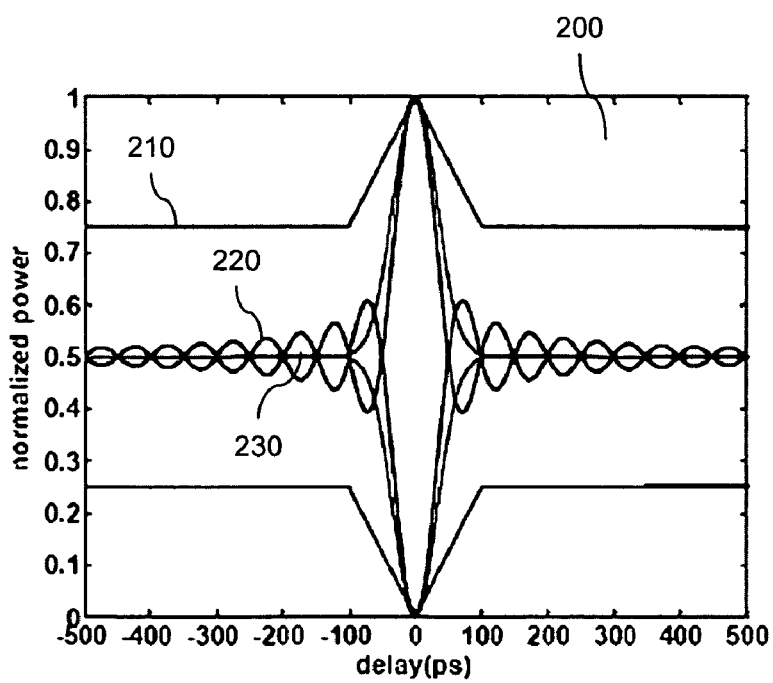
FIG. 2 is a schematic plot of oscillations and oscillation envelopes of optical power as a function of interferometer delay for a modulated signal and two broadband noise signals.

Coherent and incoherent signals display very different interferogram envelopes. An envelope 210 for a 10 Gb/s signal with pseudorandom OOK modulation is presented in the plot 200 of FIG. 2. For comparison, there is also plotted the interferograms from a 20 GHz wide square spectrum of incoherent light (line 220) and from an incoherent Gaussian spectrum (line 230) with a full width of 14 GHz. Comparison of the two broadband noise interferograms reveals that the sharp edges of the square spectrum give rise to ripples in the interferogram. The key difference between the modulated signal interferogram and both broadband noise interferograms is that the latter two have finite width, while the former continues practically indefinitely, similar to the purely monochromatic case of equation (1) above, albeit at a lower level (eventually it will be limited by the coherence time of the laser). The explanation for this is rather simple: various 1's, even when separated by more than a bit period in time, are coherent because of the underlying carrier frequency. Thus, even if the spectra of a modulated signal and incoherent noise may be of a similar width and appear almost identical when observed with a limited spectral resolution, the interferometer can distinguish between the two because of the signal's fundamental coherence.

Another instructive way to determine the envelope of a modulated signal is to repeat the arguments that led to equation (1), but assume that electric fields are modulated by a slow function of time s(t). This produces the following expression for the transmitted power:

$$I_T = \frac{I_0}{2}(1 + \cos\omega\tau)\langle s^*(t)s(t+\tau)\rangle_t \qquad (3)$$

In this expression, the oscillatory transmitted power from equation (1) is modified by the autocorrelation function of the modulation signal s(t). Naturally, $\langle s(t)s^*(t+\tau)\rangle$ gives the envelope 210 of the modulated signal shown in FIG. 2.

Measured Interferograms

The inventors have measured three interferogram envelopes with various sources, using an Exfo model IQ230 interferometer. For broadband noise sources the inventors used ASE from an SOA, which was filtered using commercially available filters from JDS Uniphase: type TB9 diffraction grating filter with bandwidth 75 GHz and type TB4500 angle-tuned thin-film filter with bandwidth 160 GHz. The third source was an unfiltered laser signal with 10 Gb/s OOK modulation, using a pseudorandom data pattern of length $2^{23}-1$. The results are shown in the plot 300 of FIG. 3 and are in excellent agreement with the simulations discussed above. All curves were normalized, so that the peak power is equal to 1 on each one of them. In particular, the modulated signal 310 is easily distinguished from the shaped noise 320, 330 at larger interferometer delays.

Figure 3:
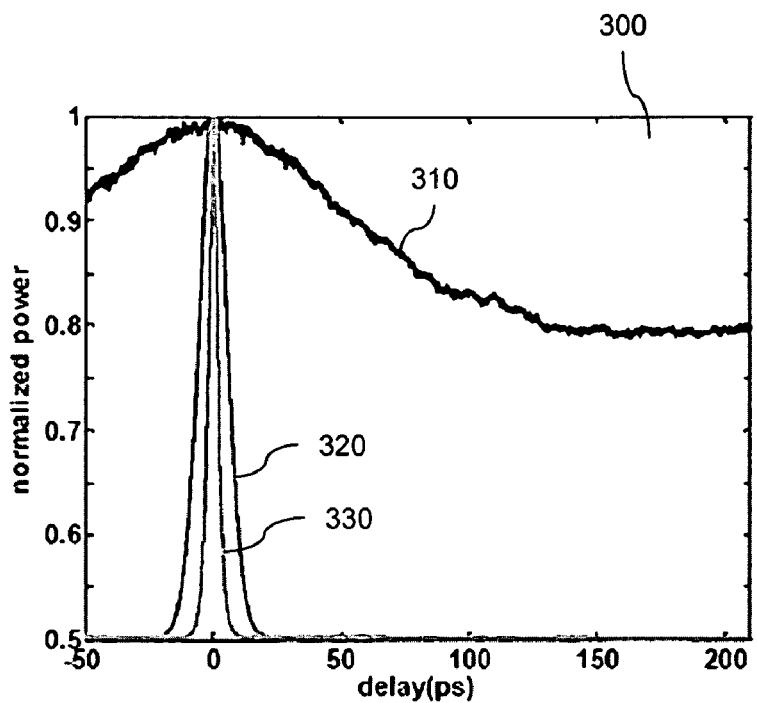
FIG. 3 is a plot of experimental interferogram envelopes for a modulated signal and two broadband noise signals.
Figure 4:
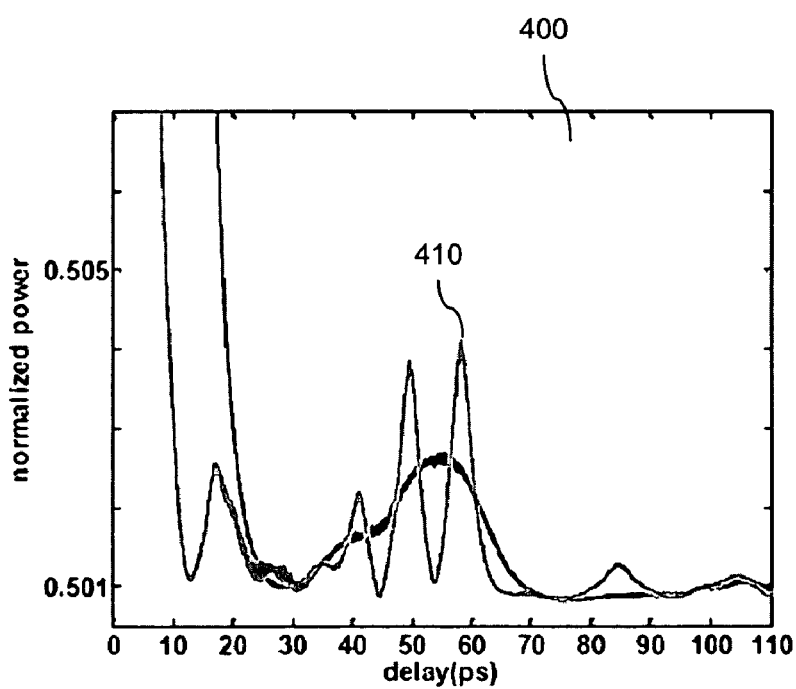
FIG. 4 is an enlarged view of an area of the plot of FIG. 3.

The plot 400 of FIG. 4 is an enlarged view of an area of the plot of FIG. 3, showing the wings of the envelopes to show the magnitude of the ripples 410 observed for those two real filters.

DESCRIPTION OF EMBODIMENTS

Figure 5:
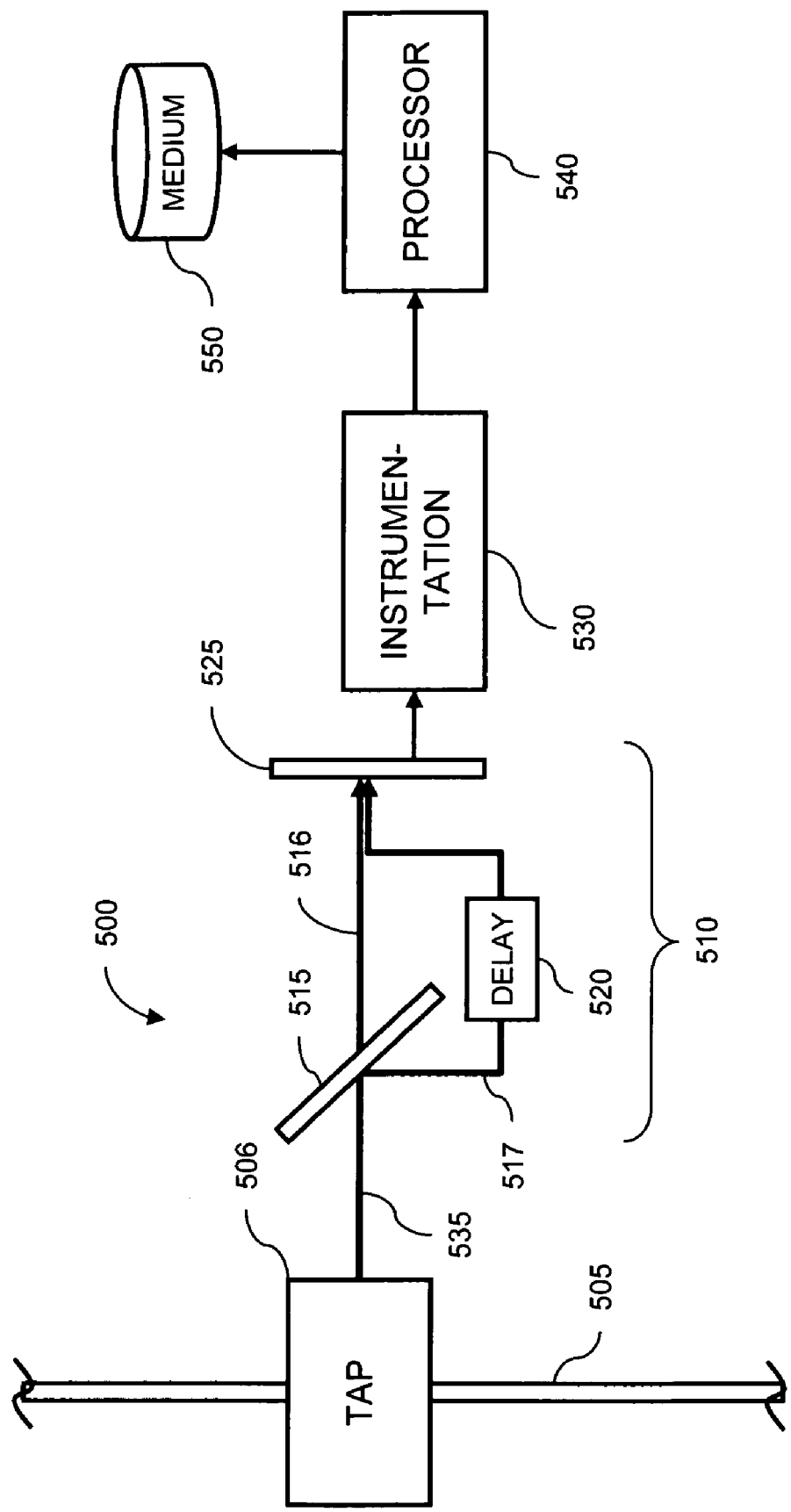
FIG. 5 is a schematic diagram of an apparatus according to one embodiment of the invention.

A schematic diagram of an apparatus 500 according to one embodiment of the invention is shown in FIG. 5. The apparatus 500 for monitoring an optical signal quality of a light signal transmitted in an optical transmission medium 505 such as an optical fiber, includes a tap 506 connected to the optical transmission medium 505 for tapping off a portion of the light signal. The tap 506 may, for example, be a partially silvered mirror or other similar device for re-routing a small percentage of the light signal in the medium 505 to form a tapped beam 535.

The tapped beam 535 enters an interferometer 510 that may include a splitter 515, a delay means 520 and a detector 525. The splitter 515 may be another partially silvered mirror for forming two beams from the tapped beam 535.

A first portion 516 of the tapped beam travels directly to a detector 525. A second portion 517 of the beam travels first through a beam delayer 520 for introducing a delay into the beam 517. In its simplest form, the beam delayer may be a length of optical fiber or planar wave guide providing a fixed delay. Other means known in the art, such as thermo-optic techniques or a free space moving mirror, may be used to introduce an adjustable delay into the beam 517.

Output power from the recombined beams 516, 517 is measured using instrumentation 530 that includes a detector 525. The beams form an interferogram (not shown) that is a function of the delay, as well as a function of the characteristics of the tapped beam 535, as discussed above. If the tapped beam 535 is a combination of a coherent modulated signal and incoherent noise, then power output at larger interferometer delays will be close to that of the coherent modulated signal alone. Additional power output measured at zero delay may thereby be attributed to incoherent noise.

A processor 540 receives and processes measurement data of the light output power from the instrumentation 530. In one embodiment, the processor is a component of a computer (not shown). In addition to the processor 540, the computer may include memory, a reader for reading computer executable instructions on computer readable media, a common communication bus, a communication suite with external ports, a network protocol suite with external ports and a graphical user interface, as is well known in the art.

The processor includes or is connected to one or more computer readable media 550, such as a hard or floppy disk in a disk drive, a magnetic tape in a tape drive, a non-volatile programmable ROM chip such as an EPROM, or volatile computer memory.

The computer readable medium 550 contains instructions that, when executed by the processor, cause the processor to compute a numerical value using the light output power measurement. That numerical value represents a relative magnitude of coherent and incoherent parts of the tapped light signal 535.

Figure 6:
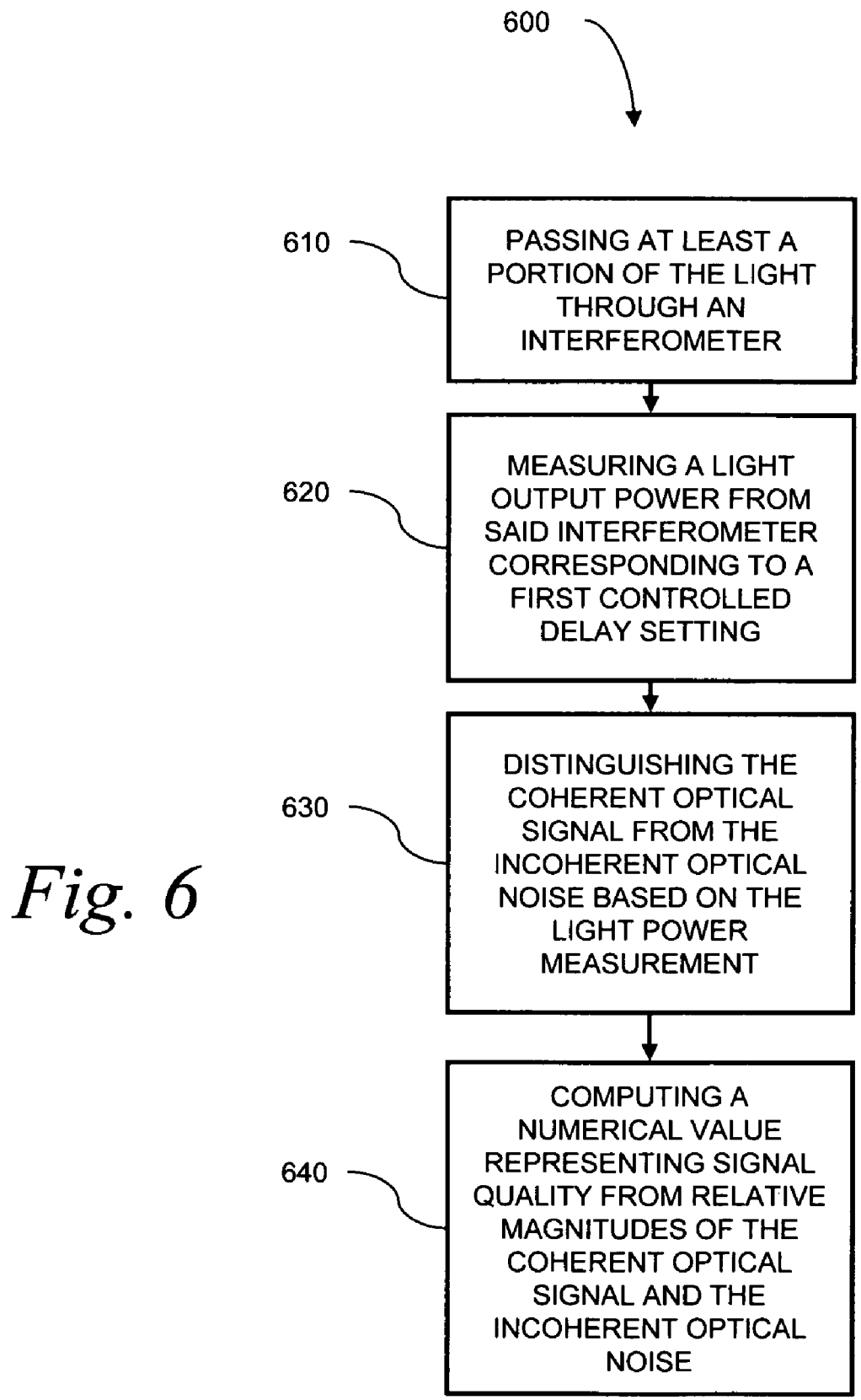
FIG. 6 is a flow chart showing a method according to one embodiment of the invention.

A method 600 according to one embodiment of the invention is shown in FIG. 6. The method measures a signal quality of light present in an optical communication medium. The light includes at least one substantially coherent optical signal degraded by substantially incoherent optical noise.

At least a portion of the light is passed (step 610) through an interferometer. The interferometer is capable of introducing a specified delay into at least one light beam of a plurality of beams split from the portion of the light. A light output power from the interferometer, corresponding to a first specified delay setting, is measured (step 620).

The coherent optical signal is then distinguished (step 630) from the incoherent optical noise based on the light power measurement. The signal may be distinguished by computing (step 640) a numerical value representing signal quality from relative magnitudes of the coherent optical signal and the incoherent optical noise.

CONCLUSION

In sum, the inventors have shown that an interferogram envelope from a modulated signal extends far beyond that of shaped broadband noise with similar bandwidth. Thus, by measuring that envelope for the interferometer delay values greater than a bit period of the modulation, it is possible to extract the signal power alone even when the signal is corrupted with optical noise. That capability makes possible new OSNR measurement techniques that are well-suited to signal integrity monitoring and diagnostics in emerging photonic networks.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to the measurement of signal-to-noise ratio in an optical telecommunications network, the method and apparatus of the invention may be used in any situation where a modulated wave signal must be separated from an unmodulated wave signal. It is to be understood that the embodiments shown and described herein are only illustrative of the principles of the present invention and that various modifications may be implemented by those skilled in the art without departing from the scope and spirit of the invention.

What is claimed is:

1. A method for measuring a signal quality of light present in an optical communication medium, the light including at least one substantially coherent optical signal degraded by substantially incoherent optical noise, the method comprising the steps of:

tapping a portion of the light from the optical communication medium;

passing the portion of the light through a two-beam interferometer capable of introducing a specified delay into at least one light beam of a plurality of beams split from the portion of the light;

measuring a light output power from said interferometer corresponding to a first specified delay setting;

measuring a light output power from said interferometer corresponding to a second specified delay setting;

determining relative magnitudes of the coherent optical signal and the incoherent optical noise based on the first and second light power measurements;

computing a numerical value representing signal quality from the relative magnitudes of the coherent optical signal and the incoherent optical noise; and determining a numerical value of an optical signal-to-noise ratio.

2. The method of claim 1, wherein the step of determining relative magnitudes of the coherent optical signal and the incoherent optical noise based on the light power is performed at a given optical frequency.

3. The method of claim 1, wherein the optical communication medium is an optical fiber.

4. The method of claim 1, wherein the step of determining relative magnitudes of the coherent optical signal and the incoherent optical noise based on the light power measurement further comprises extracting an envelope of an interferogram.

5. The method of claim 1, wherein said at least one coherent optical signal is modulated with real time data traffic during said measuring step.

6. The method of claim 1, further comprising the step of:
using power measurements corresponding to the first and second specified delay settings to determine a modulation format of the substantially coherent optical signal.

7. An apparatus for monitoring an optical signal quality of a light signal transmitted in an optical transmission medium, comprising:
a tap connected to the optical transmission medium for tapping off a portion of the light signal;
a splitter for forming two beams from the portion of the light signal;
a beam delayer for introducing a first specified delay into at least one of the two beams;
instrumentation for measuring a light output power from an interferogram formed from the two beams including the first specified delay;
a processor connected for receiving a measurement of the light output power from the instrumentation; and
a computer readable medium containing instructions that, when executed by said processor, cause the processor to compute a numerical value using said light output power measurement representing a relative magnitude of coherent and incoherent parts of the light signal; and further cause the processor to determine a numerical value of an optical signal-to-noise ratio.

8. The apparatus of claim 7, wherein said computer readable instructions contain an algorithm for distinguishing a coherent optical signal from an incoherent optical noise based on the light power output measurement.

9. The apparatus of claim 8, wherein the algorithm for distinguishing the coherent optical signal from the incoherent optical noise based on the light power is performed on data taken at a given optical frequency.

10. The apparatus of claim 8, wherein the algorithm for distinguishing the coherent optical signal from the incoherent optical noise based on the light power measurement extracts an envelope of an interferogram.

11. The apparatus of claim 7, wherein the optical communication medium is an optical fiber.

12. The apparatus of claim 7, wherein said coherent part of the light signal is modulated with real time data traffic.

13. The apparatus of claim 7, further comprising:
a second beam delayer for introducing a second specified delay; wherein:
said instrumentation is further for measuring a light output power from an interferogram formed from the two beams including the second specified delay; and
said computer readable instructions further cause the processor to use power measurements corresponding to the first and second specified delays to determine a modulation format of the coherent part of the light signal.

14. The apparatus of claim 7,
wherein said beam delayer is further for introducing an adjustable delay into at least one of the two beams;
said apparatus further comprising a delay controller arranged to adjust the resettable delay means from a first specified delay to a second specified delay; and wherein:
said instrumentation is further for measuring a light output power from an interferogram formed from the two beams including the second specified delay; and
said computer readable instructions further cause the processor to use power measurements corresponding to the first and second specified delays to determine a modulation format of the coherent part of the light signal.

* * * * *